US005227780A

United States Patent [19]

Tigwell

[11] Patent Number: 5,227,780

[45] Date of Patent: Jul. 13, 1993

[54] APPARATUS WITH A PORTABLE UHF RADIO TRANSMITTER REMOTE FOR CONTROLLING ONE OR MORE OF INFRARED CONTROLLED APPLIANCES

[75] Inventor: David C. Tigwell, Spring, Tex.

[73] Assignee: Houston Satellite Systems, Inc., Englewood, Colo.

[21] Appl. No.: 793,481

[22] Filed: Oct. 16, 1991

Related U.S. Application Data

[63] Continuation of Ser. No. 569,252, Aug. 16, 1990, abandoned, which is a continuation of Ser. No. 324,142, Mar. 16, 1989, abandoned.

[51] Int. Cl.[5] .......... H04B 10/22

[52] U.S. Cl. .......... 340/825.72; 340/825.69; 341/174; 341/176; 359/145

[58] Field of Search .......... 340/825.69, 825.72; 341/176, 174; 381/105; 455/230, 352, 92, 142, 151.2; 358/194.1, 189; 359/142, 145

[56] References Cited

U.S. PATENT DOCUMENTS

| | | | |
|---|---|---|---|
| 4,259,746 | 3/1981 | Sandstedt | 359/145 |
| 4,509,211 | 4/1985 | Robbins | 358/194.1 |
| 4,656,655 | 4/1987 | Hashimoto | 379/105 |
| 4,709,412 | 11/1987 | Seymour et al. | 455/603 |
| 4,802,114 | 1/1989 | Sogame | 340/825.72 |
| 4,809,359 | 2/1989 | Dockery | 455/603 |
| 4,812,842 | 3/1989 | Bayerlein et al. | 340/825.72 |
| 4,825,200 | 4/1989 | Evans et al. | 340/825.72 |
| 4,841,368 | 6/1989 | Rumbolt et al. | 455/352 |
| 4,864,647 | 9/1989 | Harrington | 455/601 |
| 4,885,579 | 12/1989 | Sandbank | 358/194.1 |
| 4,904,993 | 2/1990 | Sato | 455/603 |
| 4,916,532 | 4/1990 | Streck et al. | 358/83 |
| 5,109,222 | 4/1992 | Welty | 455/352 |

FOREIGN PATENT DOCUMENTS

| | | | |
|---|---|---|---|
| 0008628 | 1/1987 | Japan | 455/603 |
| 0278867 | 12/1987 | Japan | 379/102 |
| 0234697 | 9/1988 | Japan | 455/603 |
| 0129595 | 5/1989 | Japan | 358/194.1 |
| 1472035 | of 1975 | U.S.S.R. . | |
| 2201065 | 8/1988 | United Kingdom | 379/102 |
| 8911137 | 11/1989 | World Int. Prop. O. | 340/825.69 |

*Primary Examiner*—Donald J. Yusko
*Assistant Examiner*—John E. Giust
*Attorney, Agent, or Firm*—Robert J. Koch

[57] ABSTRACT

A plurality of infrared controlled appliances are controlled from a single UHF radio transmitter remote controller. The controller provides a plurality of separate distinct output control signals to an UHF to infrared transponder. The transponder has a UHF receiver, an infrared receiver, and an infrared transmitter. In one mode of operation, the transponder stores a received infrared signal and correlates it with a received UHF signal. In the operational mode, the transponder transmits a stored infrared signal through the infrared transmitter upon receiving a correlated UHF signal.

9 Claims, 8 Drawing Sheets

NOTE 1:

| S4 | S3 | MODE |
|---|---|---|
| ON | ON | PLESSY-chip MODE |
| | OFF | (FUTURE ENHANCEMENT) |
| OFF | ON | 4-DEVICE MODE (FUTURE ENHANCEMENT) |
| | OFF | SAT + 3 MODE |

NOTE 2: S2 & S1 DETERMINE THE FIRST 2 bks (SECURITY CODE) OF TRANSMITTED UHF SIGNALS

NOTE 1:

| S3 | MODE |
| --- | --- |
| ON | 4-DEVICE MODE (FUTURE ENHANCEMENT) |
| OFF | SAT + 3 MODE |

NOTE 2: S2 & S1 SET THE SECURITY CODE. (THIS TRANSPONDER REJECTS SIGNALS WITHOUT AN MONTISOL SECURITY CODE)

NOTE 3: FOR BEST CARRIER MEASUREMENT, USE R16×150K ±1% & C11×1000pF 15%

APPARATUS WITH A PORTABLE UHF RADIO TRANSMITTER REMOTE FOR CONTROLLING ONE OR MORE OF INFRARED CONTROLLED APPLIANCES

This is a continuation application of application Ser. No. 07/569,252 filed Aug. 6, 1990, now abandoned which in turn was a continuation application of application Ser. No. 07/324,142, filed Mar. 16, 1989 now abandoned.

BACKGROUND OF THE INVENTION

It is conventional to control various appliances in the home such as TV's, VCR's, and other types of appliances by infrared remote control units. However, such controls must be located in a line of sight of the equipment to be controlled. And while there are several remote control units on the market which consolidate the functions of several remote controls into a single unit, they also suffer from the requirement of having to be within line of sight of the appliance being controlled.

The present invention is directed to the control of a plurality of infrared controlled appliances from a single UHF radio remote control. The present apparatus provides full control of all house appliances from anywhere in the house from only a pocket-size remote UHF controller. The present device provides a single hand-held radio frequency remote controller and a radio frequency to infrared converter or transponder unit located in the line of sight of the appliances to be controlled. Therefore, the present invention allows control of the appliances from anywhere within the receiver range of the transponder unit which is typically 200 feet.

The present invention allows, for example, a VCR located in the living room to be controlled from a bedroom where a second television may be located and eliminates the need for a second VCR in the bedroom. Similarly, in a household with an infrared controlled stereo system with remotely located speakers, the volume of the stereo can be controlled from any room in the house.

On the other hand, the direct control of an appliance by a UHF remote controller is not feasible. Virtually all infrared remote control systems use a carrier frequency of between 10 KHz and 75 KHz. This carrier is then amplitude modulated in various fashions to transmit the digital data required for control. As a result of the carrier frequency, and the sometimes high data rate, simple AM modulation of the infrared code (including the carrier and the data), onto a UHF radio frequency carrier, would result in an occupied band width which would exceed the FCC rules for this type of device and would require excessive output power.

The present invention avoids the problems of the prior art by storing in the transponder the information necessary to replicate or mimic the infrared code for operating the various appliances. The UHF radio remote controller is then able to transmit a narrow-band data signal to the transponder identifying a particular infrared code. The transponder then transmits the infrared code sequence to the appropriate appliance.

SUMMARY

The present invention is directed to an apparatus for controlling a plurality of infrared controlled appliances and includes a UHF radio transmitter remote controller having a plurality of separate distinct output control signals. A UHF to infrared transponder is provided. The transponder includes a UHF receiver, means for converting a received UHF signal to a correlated infrared signal, and an infrared transmitter for transmitting the correlated infrared signal to an appliance.

The present invention also includes means for storing different infrared signals and means for retrieving a stored infrared signal in response to a predetermined received UHF signal.

Still a further object of the present invention is wherein the transponder includes means for receiving an infrared input for correlating with a UHF control signal.

A further object of the present invention is the provision of an apparatus for controlling a plurality of infrared controlled appliances which includes a UHF radio transmitter remote controller having a plurality of separate and distinct output control signals. A UHF and UHF to infrared transponder is provided which includes a UHF receiver, an infrared receiver, and an infrared transmitter. Means are provided in the transponder for storing a received infrared signal, and includes means for correlating a received UHF signal with a stored infrared signal, and means for transmitting a stored infrared signal to the infrared transmitter for actuating an appliance upon receiving a correlated UHF signal.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
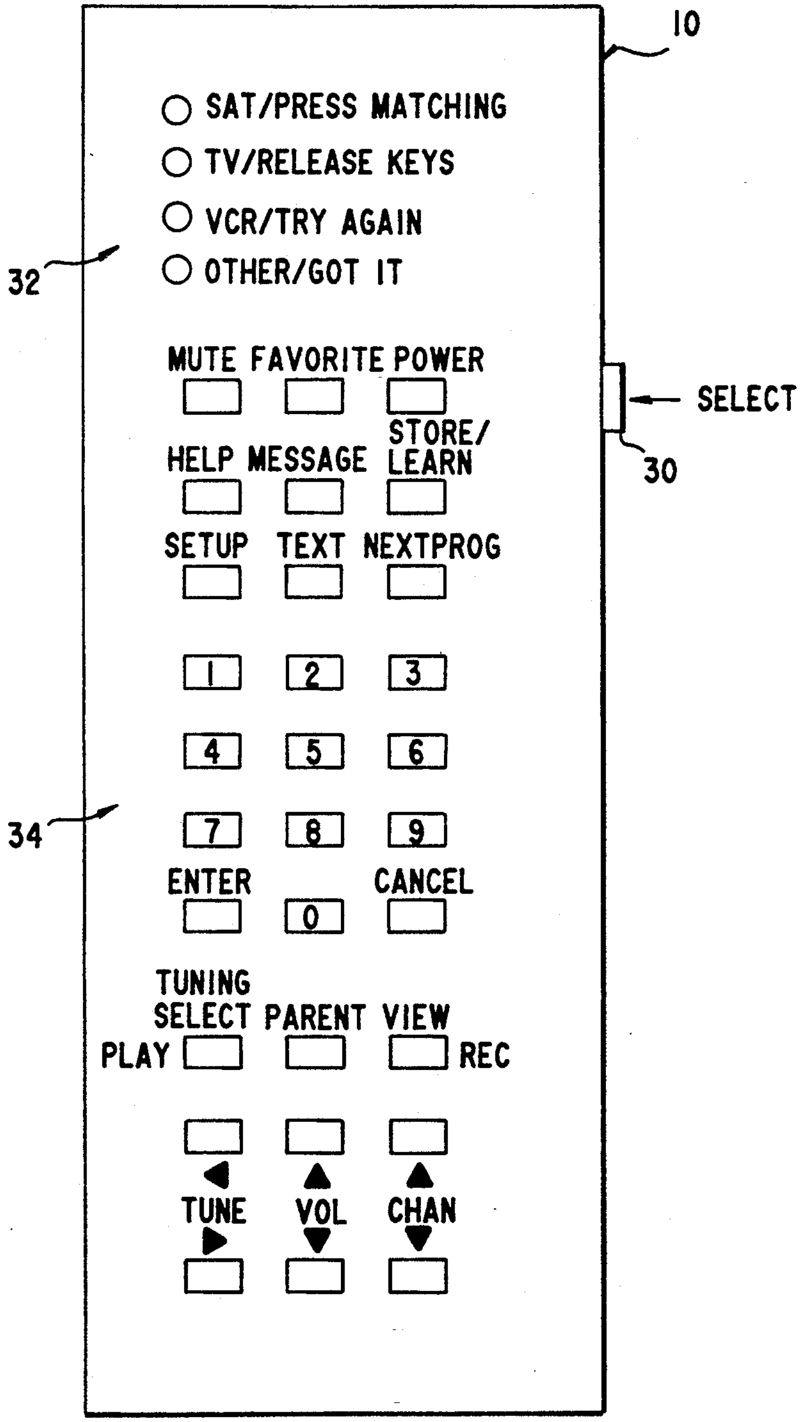
FIG. 1 is an elevational view of the UHF remote controller of the present invention.
Figure 2:
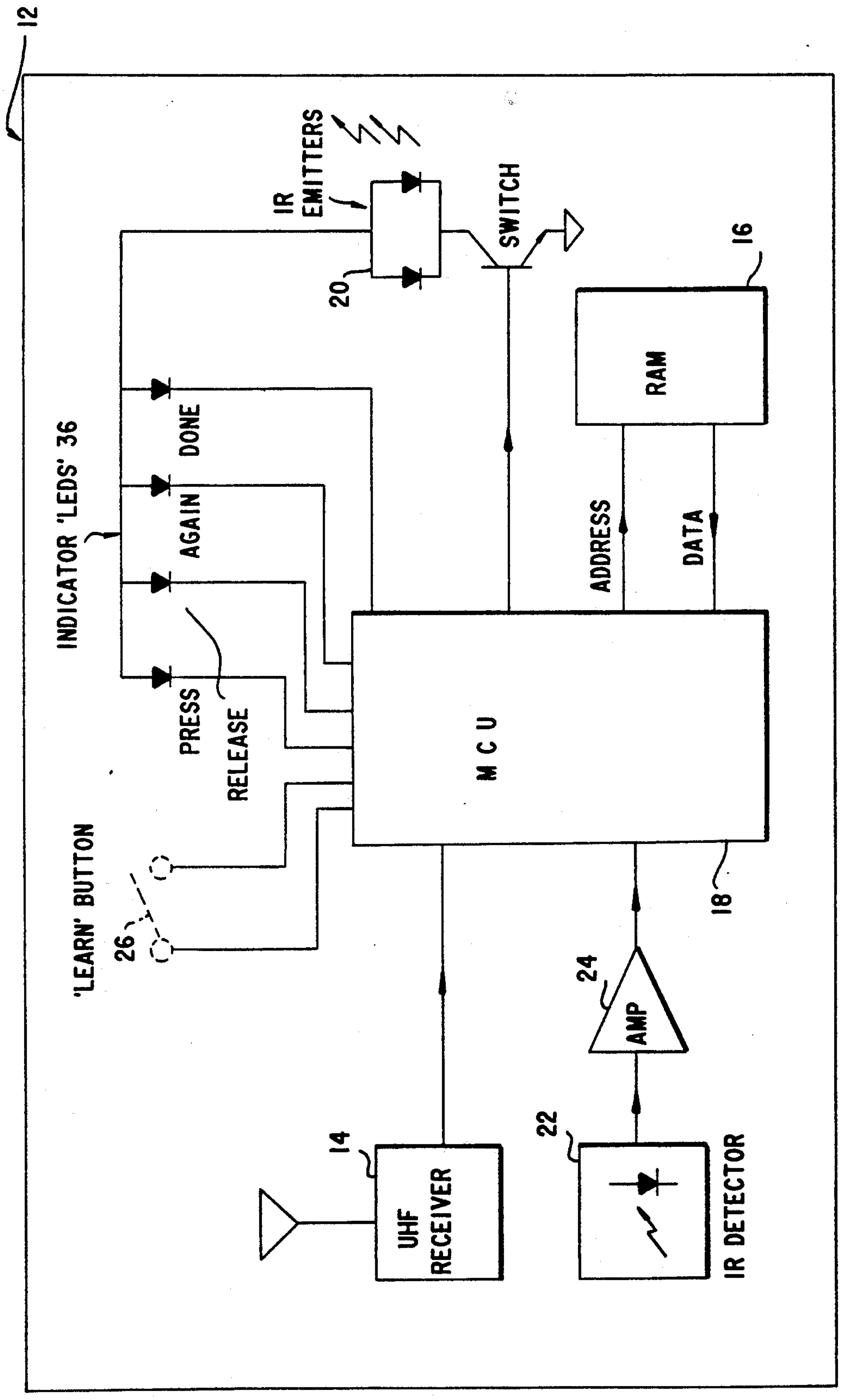
FIG. 2 is a block diagram of the UHF to infrared converter or transponder unit of the present invention.

The present invention generally includes a UHF radio transmitter remote controller 10 of FIG. 1 and a UHF to infrared transponder generally indicated by the reference numeral 12 of FIG. 2.

Normally, consumer electronic products such as satelite dishes, TV's, VCR's, stereos, etc. are controlled by an infrared remote control unit which must be operated in a line of sight of the appliance to be controlled. In the present invention, the transponder 12 must be located within the line of sight of the appliance to be controlled, but the UHF controller 10 may control the appliance from anywhere in the house within the receiver range, typically 200 feet, of the transponder 12. The present invention by using a single hand-held UHF remote controller 10 may control a plurality of infrared controlled devices which are located in line of sight of the transponder 12.

It is not-feasible to control the infrared controlled appliance directly by the UHF controller 10 as the modulation of the infrared code (including the carrier and the data) onto a UHF radio frequency carrier would result in an occupied band width which would exceed the FCC rules for this type of device.

The present invention avoids this problem by storing the information necessary to mimic or replicate the infrared code to operate each of the infrared controlled appliances in the transponder 12. The UHF hand-held controller 10 then transmits a narrow-band data frame, such as pulse position modulation containing a two-bit security code and a 7-bit data word. The output signal from the controller 10 is then correlated with the previously-stored infrared code in the transponder 12 by any means well known in the art such as data retrieval using the transmitted 7-bit data word as the address for RAM 16. The memory location in RAM 16 selected by the 7-bit data work contains the previously-stored infrared code. The transponder 12 then transmits an infrared code sequence to the appliance being controlled.

Referring to FIG. 2, the UHF to infrared transponder 12 includes at least a UHF receiver 14, a means for storing infrared codes such as a RAM 16, and means for correlating a received UHF signal to a correlated infrared signal such as a microprocessor 18, and an infrared transmitter 20 for transmitting a correlated infrared signal to an appliance. If desired, the RAM 16 may be preprogrammed with the necessary infrared codes to operate the appliances which are to be controlled and the various output signals received by the UHF receiver 14 could be correlated with the preprogrammed infrared codes in the RAM 16 and converted by the processor 18 and transmitted to the infrared transmitter 20.

However, the preferred embodiment of the present invention is preferably provided with a "learn" mode which is used in conjunction with both the UHF controller 10 and the infrared control unit (not shown) which normally controls the appliance. In the "learn" mode, the transponder 12 includes an infrared detector 22 and an amplifier 24 which receives the output from the conventional infrared control unit.

Basically, the "learn" mode is initiated by pressing the learn button 26 which causes the microprocessor 18 to begin monitoring the input from the UHF receiver 14 as well as the input of the infrared detector 22. The user presses a key on the infrared remote unit, whose function is to be learned or mimiced simultaneously with an associated key on the UHF controller 10. The processor 18 records the wave form of the infrared unit and stores the information of this data in the RAM 16. During this learn process, the microprocessor 18 is also sampling the UHF receiver 14 and one of the plurality of separate distinct output control signals generated by the push buttons thereon and correlates the received UHF key code with the address to which the infrared data has been stored. This process is repeated until all of the keys on the various infrared remote units are stored.

Thereafter, in the operational mode, the microprocessor 18 monitors the output of only the UHF receiver 14. When a UHF key code is detected, the microprocessor 18 receives the correlated infrared data previously stored at its associated address in the RAM 16 and plays it back by driving the infrared transmitter 20. This causes infrared radiation to be generated by the infrared LED's identical to that which has been received during the "learn" mode. Therefore, the transmittal of a specific UHF output signal performs the same function on the controlled appliance, and can be done from a remote location, the same as if the key on the original infrared remote unit was pressed. In the operational mode, the infrared detector 22 is not sampled.

Figures 3, 3A:
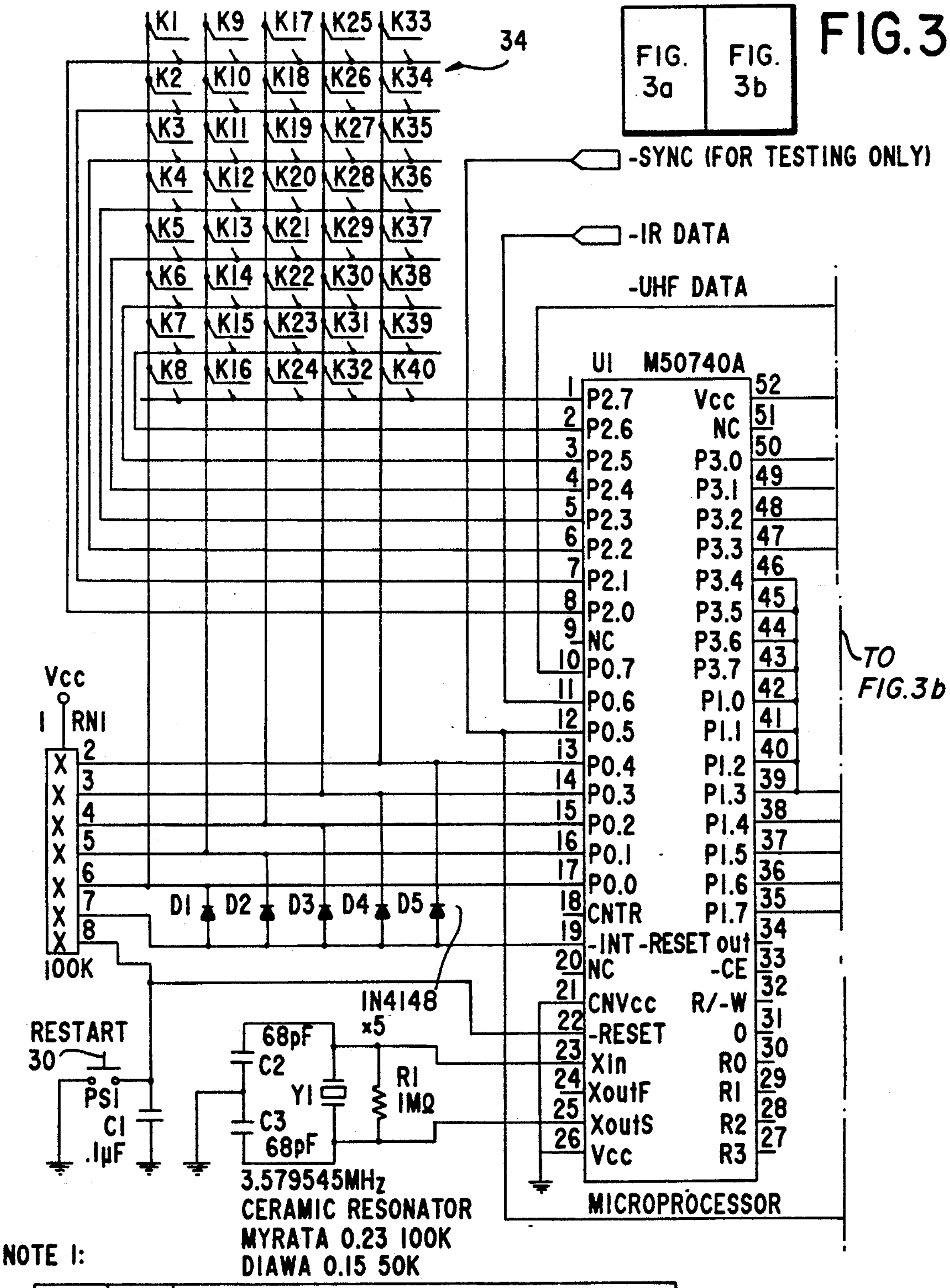
FIGS. 3, 3*a*, and 3*b* are an electrical schematic of the UHF remote controller of FIG. 1, and FIGS. 4, 4*a*, 4*b*, 4*c*, and 4*d* are an electrical schematic of the UHF to infrared transponder of FIG. 2.
Figure 3B:
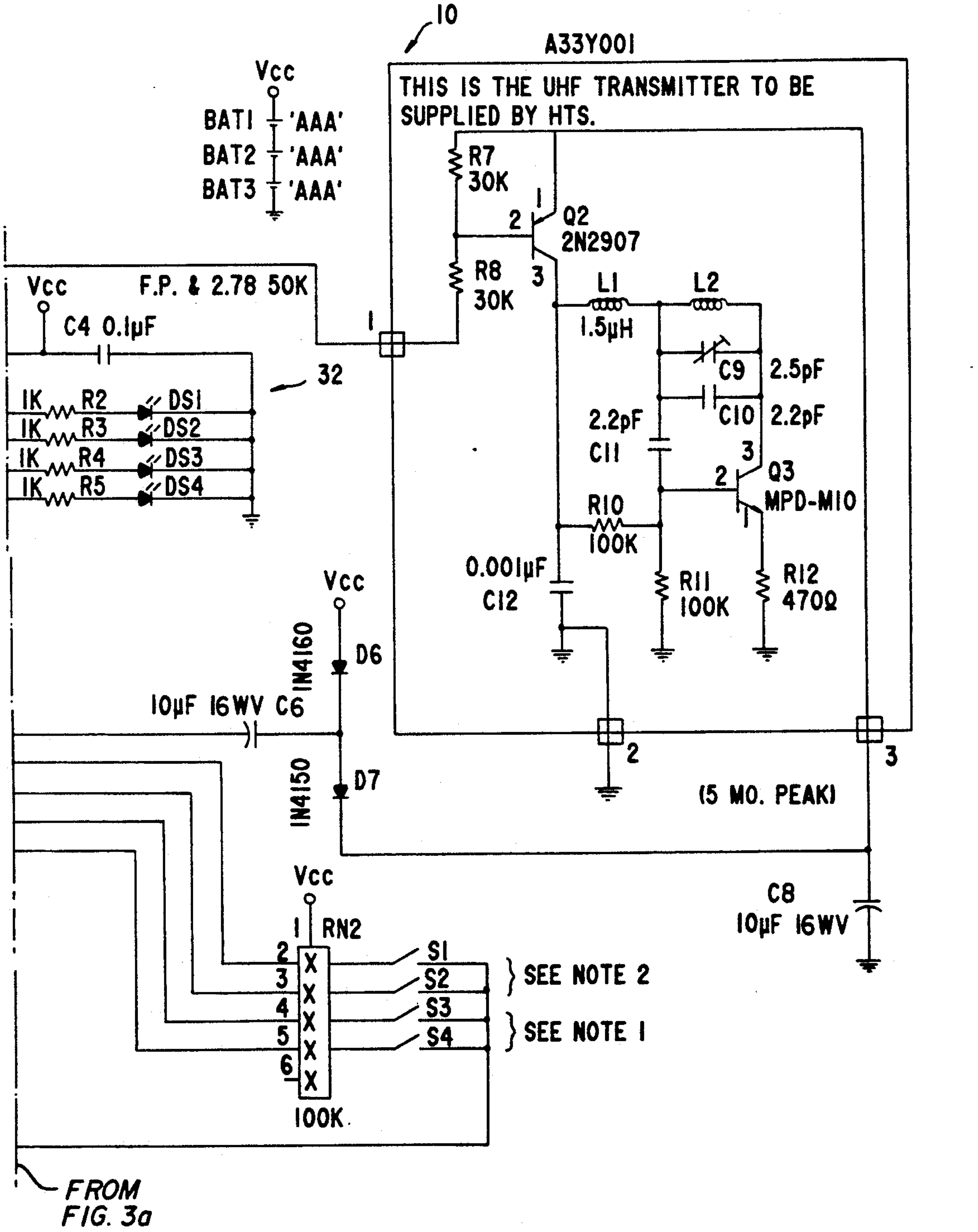
Figure 4A:
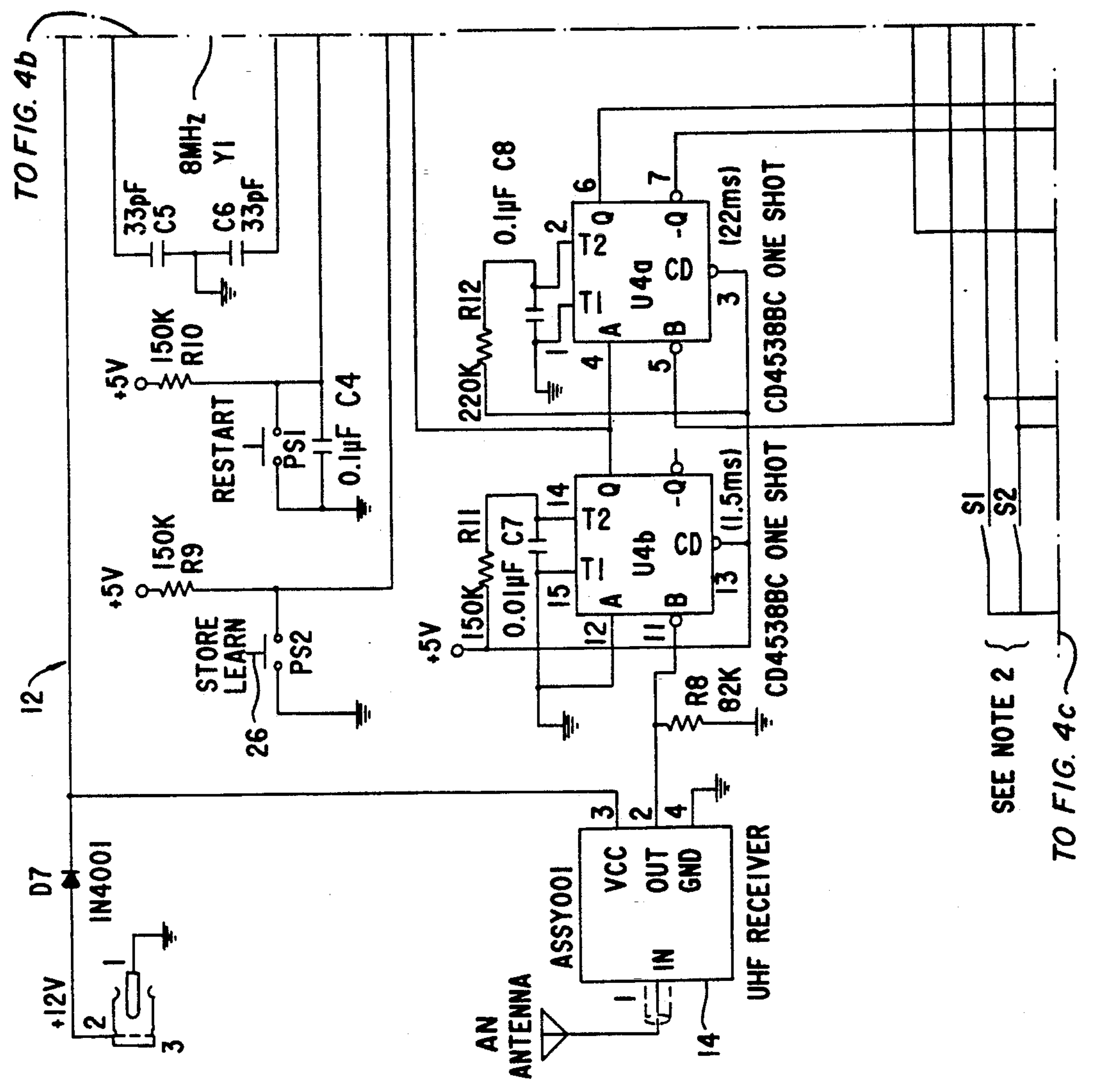
Figure 4:
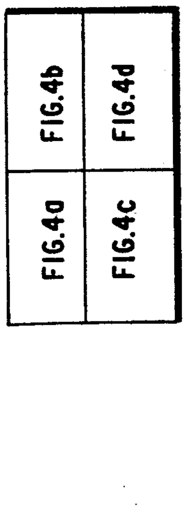
Figure 4B:
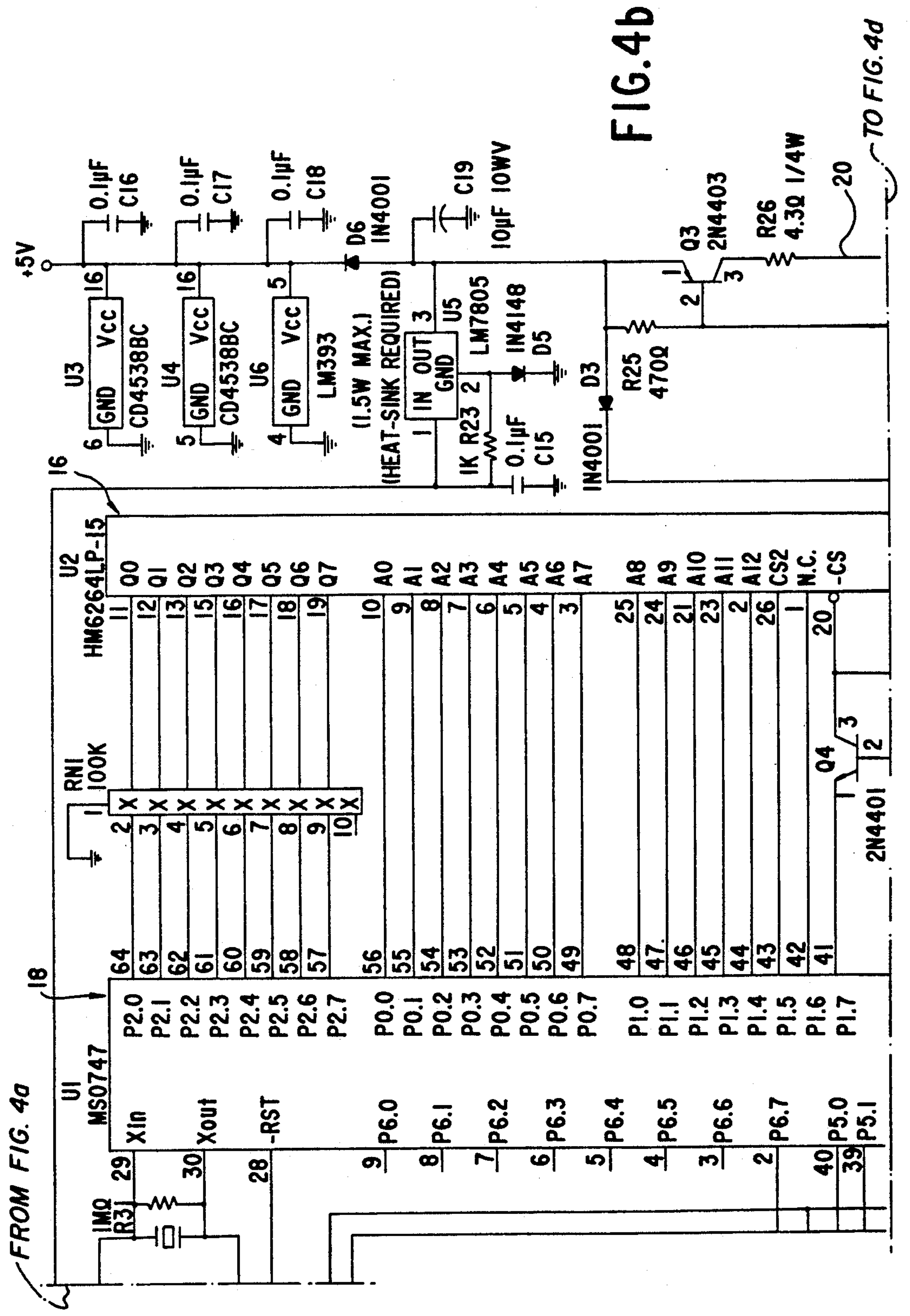
Figure 4C:
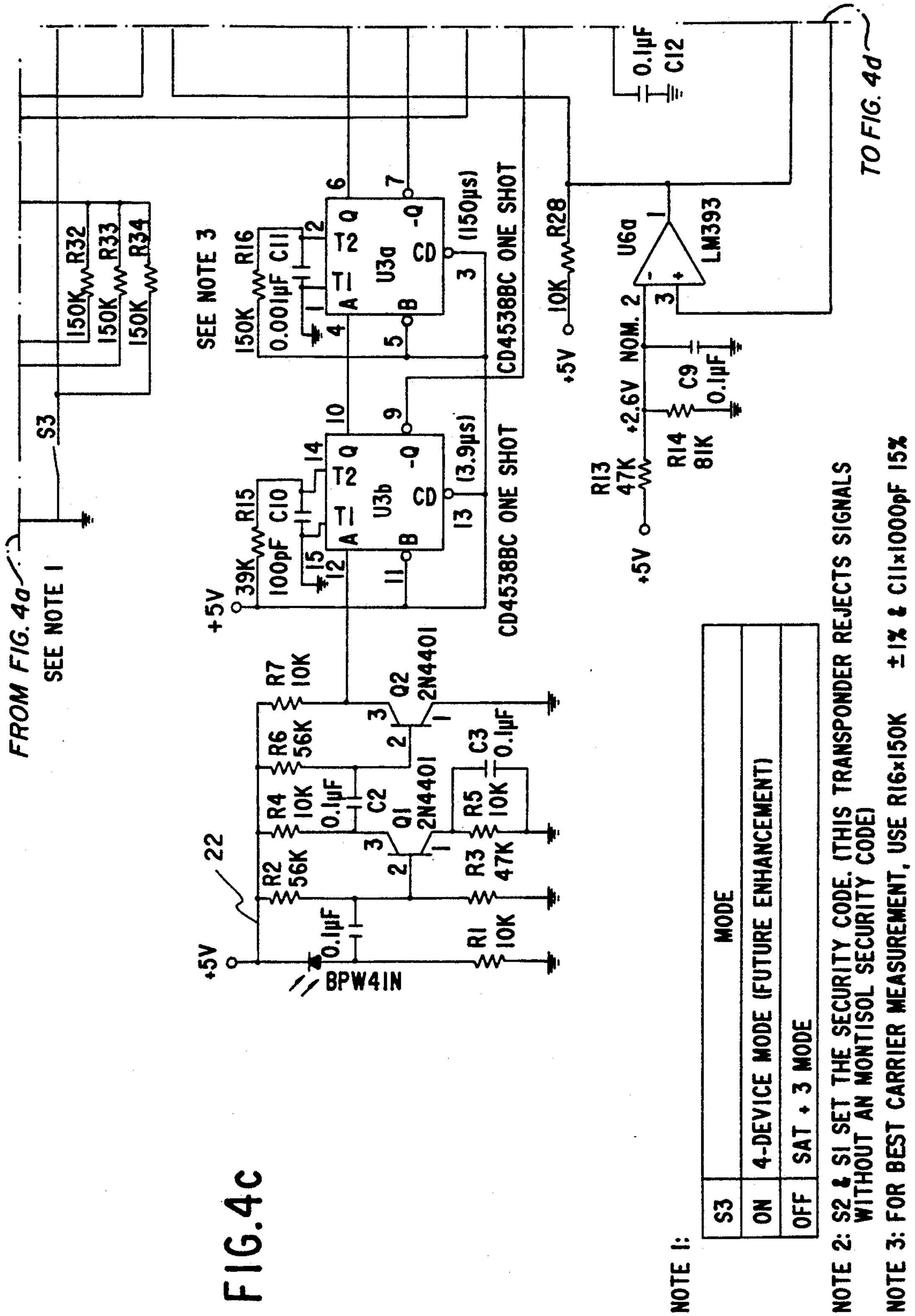
Figure 4D:
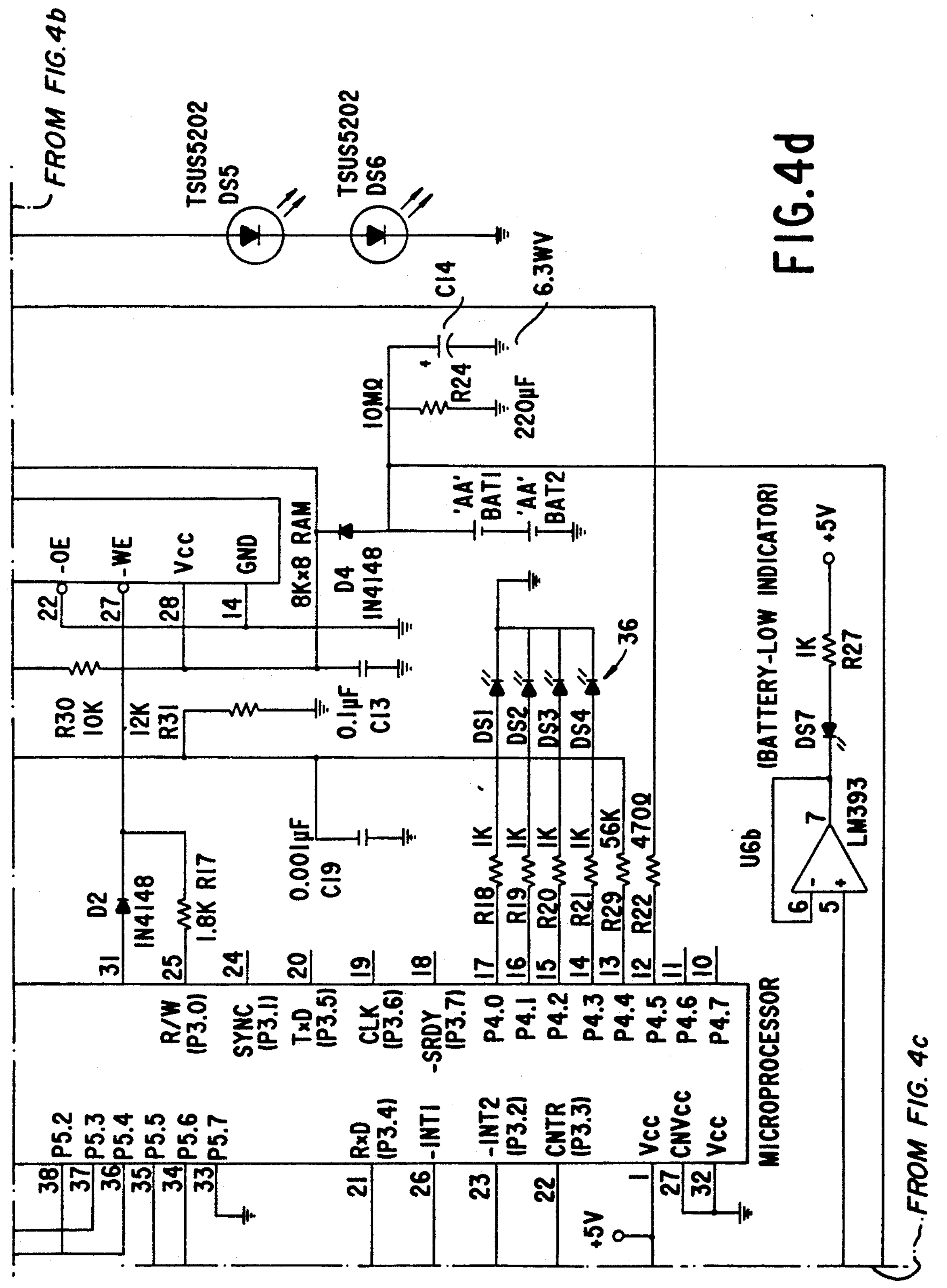

Referring now to all of the drawings, initially the switches S1 and S2 (FIG. 3) in the UHF controller 10 are set the same as the switches S1 and S2 in the transponder 12 (FIG. 4) to set the first two bits of the security code of the transmitted UHF signals. A select push button 30 located on the controller 10 is actuated to select the appliance that is to be controlled such as satelite dish, TV, VCR, or others such as stereo systems. When the select button 30 is pressed, the selection is noted by one of the LED's 32. In addition, the UHF controller contains a plurality of keys 34 here shown in a physical matrix of 10 times 3 for a total of 30 keys on the controller 10, but an 8×5 electrical matrix in a schematic of FIG. 3. For example, if the TV appliance is selected, the TV LED would light up and the infrared remote control unit (not shown) which normally actuates the TV is placed adjacent the infrared detector 22 of the transponder 12. The learn button 26 on the transponder 12 is actuated. The transponder 12 includes a plurality of indicator LED's and the "Press" LED will then flash. This requires the operator to press the key on the infrared control unit to be learned and also to press one of the keys 34 on the UHF controller 10 that the operator wishes to use when transmitting the same signal that was pushed on the infrared remote unit. The microprocessor 18 records the wave form emitted by the infrared unit and detected by the infrared detector 22 and stores a compressed version of the data into the RAM 16. Simultaneously, the microprocessor 18 associates the received UHF output signal with the address to which the infrared data has been stored. At the successful completion of this process, the Release LED 36 is illuminated. If an error was detected in the learning process, the Again LED 36 is flashed, requesting the user to try again. If the process is successful, the Done LED is illuminated momentarily. This process is repeated until all of the keys on the various infrared remote units are stored.

Preferably, the wave form transmitted by the UHF controller 10 consists of an amplitude modulated (on/-off keyed) carrier. Transmitters differ in carrier frequency and duty cycle, number of bits and message, pulse widths, inter-pulse periods, message length, intermessage periods, and modulation mode. Most modulation modes including pulse width modulation, pulse position modulation, by-phase, and pulse code modulation are similar in that the wave form consists of a series of burst of carrier pulses. Frequency modulation does not seem to enjoy widespread use and therefore amplitude modulation is preferable and all AM modes will be handled in a similar fashion, that is, largely ignoring the modulation method and focusing on the on/off times of the carrier.

In operation, the user merely presses the desired key, one of keys 34 on the controller 10, which will cause the controller 10 to send out a selected and distinct UHF output signal. When the UHF signal is detected by the transponder 12, the microprocessor 18 retrieves the infrared data previously stored in the RAM 16 and plays it back by driving the infrared transmitter 20. This causes infrared radiation to be generated by the transponder 12 identical to that received during the learn mode. Therefore, the same function on the controlled appliance is controlled as if the key on the original infrared remote unit were pressed.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, and steps of the process, will be readily apparent to those skilled in the art, and which are encompassed within the spirit of the invention and the scope of the appended claims.

What is claimed is:

1. A remote control system comprising:

an appliance user control interface connected to and integrated with a narrow-band UHF transmitter in a hand-held portable housing;

a UHF receiver tuned to transmission characteristics of said UHF transmitter;

an instruction set translation unit correlating a UHF instruction set to an IR instruction set connected to said UHF receiver;

an IR transmitter connected to said instruction set translation unit.

2. A remote control system according to claim 1 wherein said instruction set translation unit is a programmable instruction set translation unit.

3. A remote control system according to claim 1 further comprising:

an IR receiver connected to said instruction set translation unit.

4. A remote control system comprising:

user interface means for generating a first appliance instruction set;

means for transmitting a UHF data frame signal corresponding to an appliance instruction within said first appliance instruction set connected to and integrated with said means for generating in a hand-held portable housing;

means for receiving said UHF data frame signal;

non-linear means, connected to said means for receiving, for transforming said data frame signal corresponding to an appliance instruction within said first appliance instruction set to a second appliance instruction within a second appliance instruction set;

means for transmitting an IR signal corresponding to an appliance instruction within said second appliance instruction set responsive to said means for transforming.

5. A remote control system according to claim 4 wherein said means for transforming includes, means for storing different infrared signals, and means for retrieving a stored infrared signal in response to a predetermined received UHF signal.

6. A remote control system according to claim 5 wherein said means for transforming includes, means for receiving an infrared input for correlating with a UHF control signal.

7. A remote control system according to claim 4 wherein said means for transforming comprises a table having addresses corresponding to said first instruction set and table entries corresponding to said second instruction set.

8. A remote control system according to claim 7 further comprising means for receiving an IR signal connected to said means for transforming.

9. A remote control system according to claim 8 further comprising means for programming said means for transforming with second instruction set entries from said means for receiving an IR signal correlated with first instruction set entries from said means for receiving a UHF signal.

* * * * *